(12) United States Patent
Gredler et al.

(10) Patent No.: US 8,259,564 B1
(45) Date of Patent: Sep. 4, 2012

(54) EGRESS PROTECTION FOR LABEL SWITCHED PATHS

(75) Inventors: Hannes Gredler, Pillberg (AT); John Galen Scudder, Ann Arbor, MI (US); Nischal Sheth, Los Altos, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 669 days.

(21) Appl. No.: 12/425,503

(22) Filed: Apr. 17, 2009

Related U.S. Application Data

(60) Provisional application No. 61/122,126, filed on Dec. 12, 2008.

(51) Int. Cl.
*G06F 11/00* (2006.01)
(52) U.S. Cl. .......................... 370/227; 370/218; 370/221
(58) Field of Classification Search .................. 370/218, 370/217, 221, 225, 277, 228
See application file for complete search history.

(56) References Cited

U.S. PATENT DOCUMENTS

| | | | |
|---|---|---|---|
| 2008/0170493 A1* | 7/2008 | Vasseur | 370/217 |
| 2009/0296568 A1* | 12/2009 | Kitada | 370/221 |
| 2010/0008222 A1* | 1/2010 | Le Roux et al. | 370/228 |
| 2010/0020679 A1* | 1/2010 | Decraene et al. | 370/219 |

FOREIGN PATENT DOCUMENTS

| | | | |
|---|---|---|---|
| WO | PCT/FR07/51999 | * | 4/2008 |
| WO | PCT/FR2007/052003 | * | 4/2008 |
| WO | PCT/JP2007/00317 | * | 10/2008 |

OTHER PUBLICATIONS

J.L. Le Roux et al., "Fast Reroute in MPLS L3VPN networks Towards CE-to-CE Protection," www.mpls2006.com, 2006, 10 pgs.

* cited by examiner

*Primary Examiner* — Anh-Vu Ly
*Assistant Examiner* — Christopher R Crompton
(74) *Attorney, Agent, or Firm* — Shumaker & Sieffert, P.A.

(57) ABSTRACT

This disclosure describes techniques for protecting an endpoint of a label switched path. In one embodiment, a system includes an ingress router, a primary egress router, backup router, and a point of local repair (PLR) router. The ingress router, the PLR router, and the first egress router form a first label switched path. The backup router provides protection for the primary egress router such that the backup router provides routing services for the first egress router when the first egress router is not available. The primary egress router and the backup router share an anycast IP address. The backup router advertises a route to reach the primary egress router, but upon receiving a packet intended for the primary egress router, the backup router identifies the destination of the packet and forwards the packet to the destination instead of the primary egress router along a different route.

21 Claims, 7 Drawing Sheets

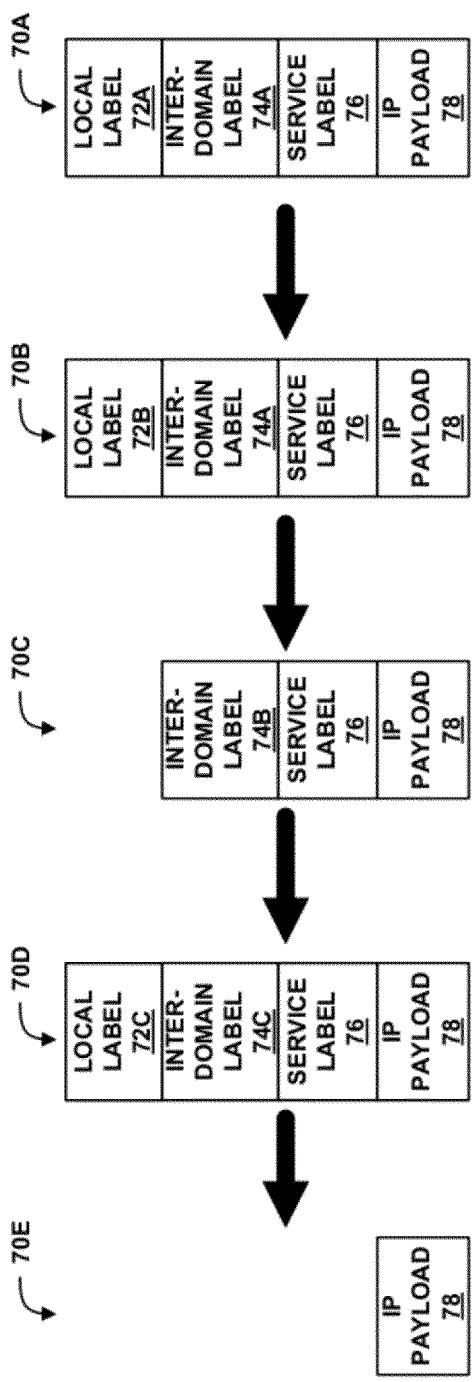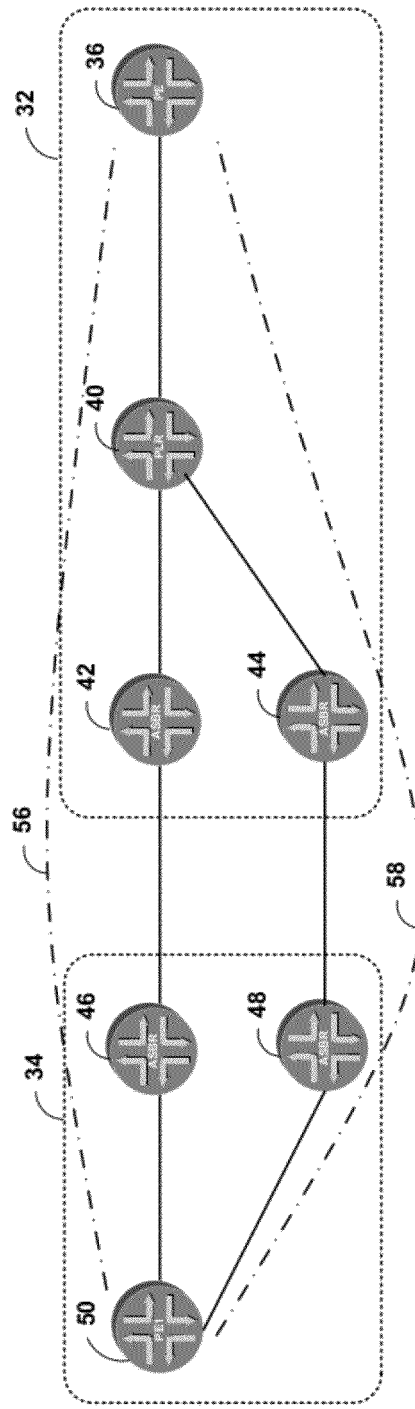
FIG. 2A

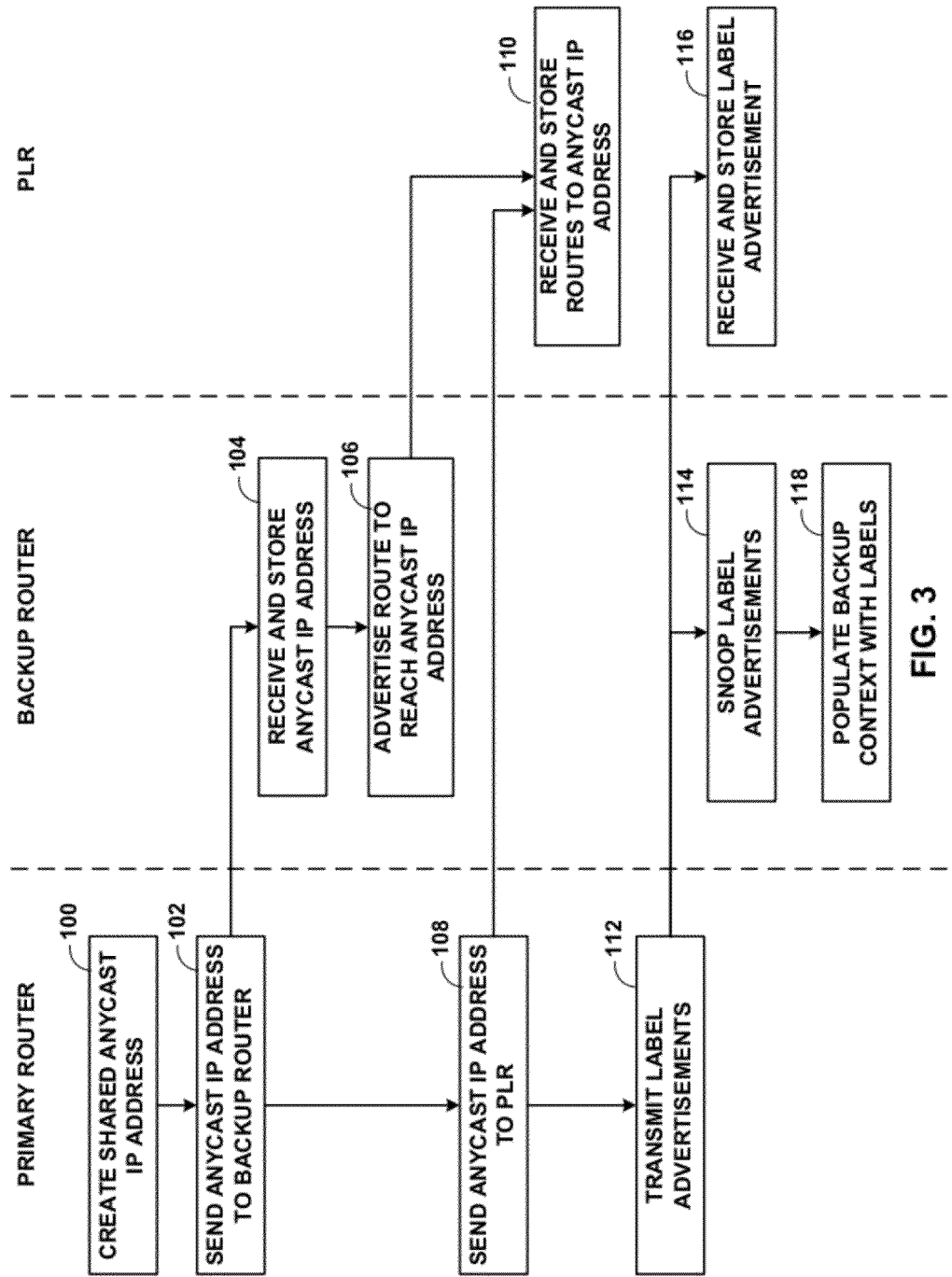

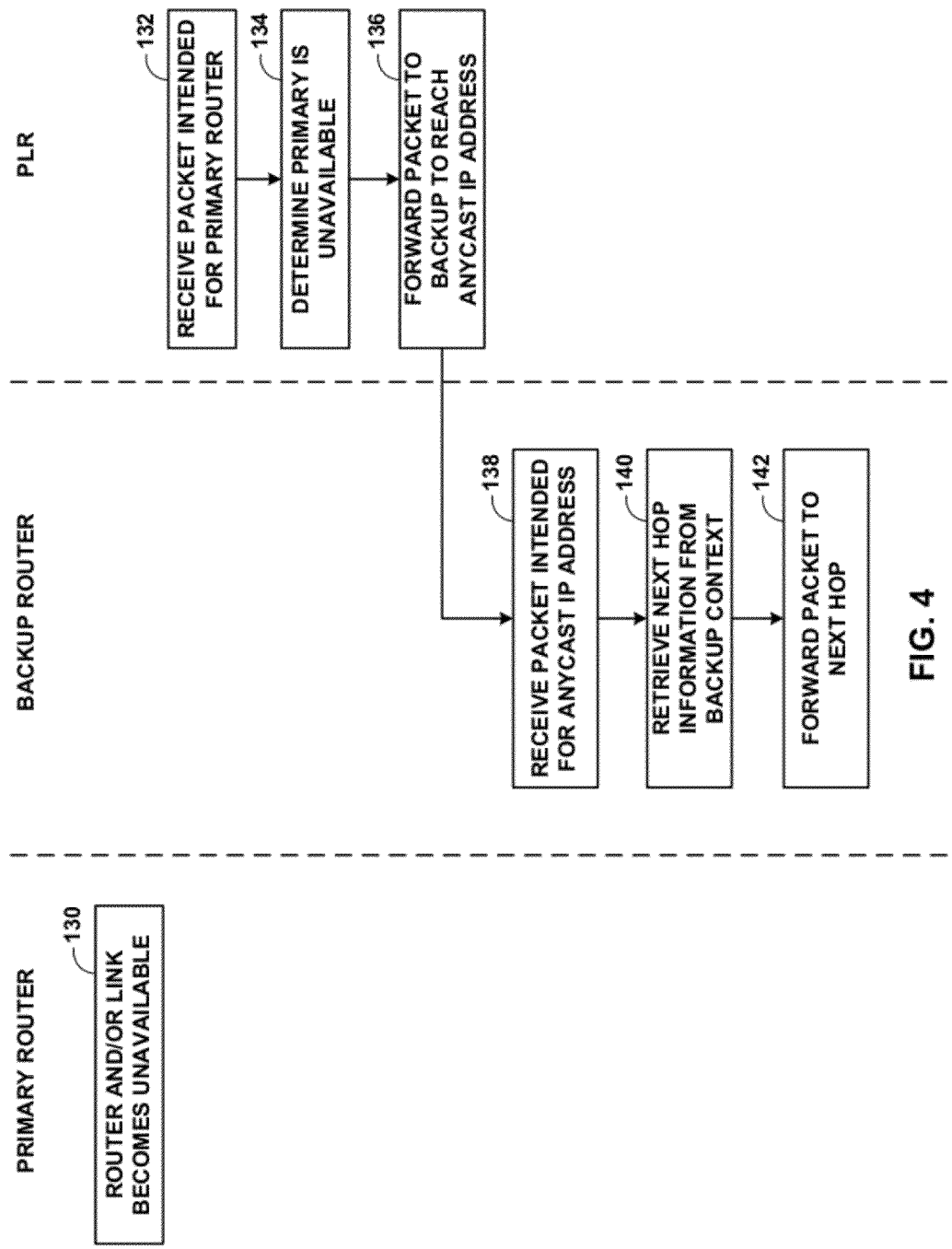

EGRESS PROTECTION FOR LABEL SWITCHED PATHS

This application claims the benefit of U.S. Provisional Application No. 61/122,126, filed Dec. 12, 2008, the entire content of which is incorporated herein by reference.

TECHNICAL FIELD

This disclosure relates to computer networks, and more particularly to routing packets within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Routing devices within a network, often referred to as routers, maintain routing information that describes available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links Packet-based computer networks increasingly utilize label switching protocols for traffic engineering and other purposes. Multi-Protocol Label Switching (MPLS) is a mechanism used to engineer traffic patterns within Internet Protocol (IP) networks. MPLS may be viewed as a protocol that allows packet-based networks to emulate certain properties of a circuit-switched network. By utilizing MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

Routers at the beginning of the LSP are commonly known as ingress routers, while routers at the end of the LSP are commonly known as egress routers. Ingress and egress routers as well as intermediate routers along the LSP that support MPLS are more generally referred to as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP. The ingress label edge router (LER) uses routing information, propagated from the egress LER, to determine the LSP, to assign labels for the LSP, and to affix a label to each packet of the FEC. The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with standard routing protocols.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In some instances, a router along an LSP may no longer be available. For example, the router may experience a failure event, such as when one or more components of the router fail, the router is brought down by a user, such as a network operator, or a link along the LSP coupled to the router fails. The router may be brought down by the network operator for a variety of reasons, such as when the router requires servicing in the form of a software, hardware, or firmware upgrade, or for other reasons. Routers along the LSP may implement an automatic corrective scheme to avoid a router that is no longer available. MPLS fast reroute, also known as MPLS local protection, is one scheme that routers implement to automatically correct instances of router or link failure. In accordance with MPLS fast reroute, each router along an LSP allocates a backup path to reach the egress router, such that the backup path utilizes a different next hop along a different link. When a router along an LSP is no longer available, the upstream router thereof (known as the point of local repair, or PLR) forwards traffic of the LSP along the backup path to reach the egress router of the LSP. There is currently no automatic corrective scheme to repair an LSP in the case that the egress router itself is unavailable.

SUMMARY

In general, techniques are described to provide routing protection for a label switched path (LSP) in the case that an egress router that terminates the LSP is no longer available. A second router that provides a route to the destination of the traffic flowing through the LSP may be configured to provide routing protection in the event the egress router fails or is no longer reachable by the upstream LSR.

For example, initially, the egress router of the LSP and the second router cooperate to establish the second router as a backup router for the egress router of the LSP, where the second router is typically not already selected as an LSR along the LSP. The backup egress router advertises to the LSR immediately upstream along the LSP from the current egress router (i.e., the point of local repair, "PLR") and informs the upstream LSR that the backup router exists and is able to provide a viable path to reach the egress router, although this may not in fact be the case. When the egress router is no longer available, the PLR may automatically redirect traffic of the LSP to the backup router in order to reach the otherwise unreachable egress router of the LSP. The backup router, however, terminates the LSP (i.e., operates as an egress LSR for the LSP) by extracting encapsulated packets from the MPLS traffic and forwards the packets to their actual destination instead of to the egress router. In this manner, the backup router provides automatic protection for an egress router of an LSP in a manner that is seamless to any upstream LSRs positioned along the LSP. The techniques described herein are applicable to any number of backups for an egress router, and a backup router may provide protection for any number of egress routers.

In one embodiment, a method includes outputting one or more label advertisements in accordance with a label distribution protocol to establish a label switched path (LSP) through a network from an ingress router to an egress router, configuring a backup router within the network to maintain a backup forwarding context, in addition to a native forwarding context, that stores one or more labels advertised by the egress router as if the labels were advertised by the backup router, wherein the backup forwarding context maps the labels advertised by the egress router to forwarding next hops of the backup router, wherein the backup router stores the forwarding next hops of the backup router in the native forwarding context, switching to the backup forwarding context within the backup router upon receiving a multiprotocol label switching (MPLS) packet intended for the egress router of the LSP and including at least one of the labels advertised by the egress router, and using the backup forwarding context, modifying a label stack of the MPLS packet with one of the labels of the backup forwarding context and forwarding the MPLS packet with the backup router to a destination as if the backup router were the egress of the LSP.

In another embodiment, a system includes an ingress router of a network, an egress router of the network that outputs one or more label advertisements in accordance with a label distribution protocol to establish a label switched path (LSP) through the network from the ingress router to the egress router, a backup router that maintains a native forwarding context that stores one or more labels advertised by the backup router and forwarding next hops associated with the labels advertised by the backup router, and a backup forwarding context that stores one or more labels advertised by the egress router as if the labels were advertised by the backup router, wherein the backup forwarding context maps the labels advertised by the egress router to the forwarding next hops stored in the native forwarding context, and a point of local repair (PLR) router that receives the label advertisements of the egress router and the labels advertised by the backup router, wherein the PLR router lies along the LSP, and wherein when the PLR router determines that the egress router is not available, the PLR router forwards at least one multiprotocol label switching (MPLS) packet that was intended for the egress router to the backup router and that includes at least one of the labels advertised by the egress router, wherein the backup router switches to the backup forwarding context within the backup router upon receiving the MPLS packet, uses the backup forwarding context to modify a label stack of the MPLS packet with one of the labels of the backup forwarding context, and forwards the MPLS packet to a destination as if the backup router were the egress of the LSP.

In another embodiment, a router includes a routing engine that receives one or more label advertisements in accordance with a label distribution protocol from an egress router for establishing a label switched path (LSP) between the egress router and an ingress router, wherein the routing engine generates backup forwarding information from the one or more label advertisements, and a forwarding engine that maintains a native forwarding context that stores one or more labels advertised by the backup router and forwarding next hops associated with the labels advertised by the backup router, and a backup forwarding context that stores the backup forwarding information generated by the routing engine, wherein the backup forwarding context maps the labels advertised by the egress router to the forwarding next hops stored in the native forwarding context wherein, upon receiving a multiprotocol label switching (MPLS) packet intended for the egress router of the LSP and that includes at least one of the labels advertised by the egress router, the forwarding engine switches to the backup forwarding context within the backup router and, using the backup forwarding context, modifies a label stack of the MPLS packet with one of the labels of the backup forwarding context and forwards the MPLS packet to a destination as if the router were the egress of the LSP.

In another embodiment, a computer-readable medium contains instructions. The computer-readable medium may be a computer-readable storage medium. The instructions cause a programmable processor to output one or more label advertisements in accordance with a label distribution protocol to establish a label switched path (LSP) through a network from an ingress router to an egress router, configure a backup router within the network to maintain a backup forwarding context, in addition to a native forwarding context, that stores one or more labels advertised by the egress router as if the labels were advertised by the backup router, wherein the backup forwarding context maps the labels advertised by the egress router to forwarding next hops of the backup router, wherein the backup router stores the forwarding next hops of the backup router in the native forwarding context, switch to the backup forwarding context within the backup router upon receiving a multiprotocol label switching (MPLS) packet intended for the egress router of the LSP and including at least one of the labels advertised by the egress router, and use the backup forwarding context to modify a label stack of the MPLS packet with one of the labels of the backup forwarding context and to forward the MPLS packet with the backup router to a destination as if the backup router were the egress of the LSP.

The techniques described herein may provide several advantages. For example, the techniques may provide failure protection for an egress router of an LSP when the egress router is no longer available, due to a failure event, being brought down, when a link of the LSP coupled to the egress router fails, or for other reasons. The techniques described herein provide a repair scheme that may enable efficient MPLS LSP failover and convergence, e.g., within 50 ms, after the egress router is no longer available. The techniques described herein may apply to local LSPs, transport LSPs, service LSPs, or other LSPs. Moreover, the techniques described herein may be implemented on a per-device basis, thus no changes to routing protocols are necessary for implementation and upstream LSRs need not be modified.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 2A-2B are block diagrams illustrating changes to labels of a packet as the packet is forwarded through the example system of FIG. 1.

FIG. 3 is a flowchart illustrating an example method for populating a backup context of a backup egress router.

FIG. 4 is a flowchart illustrating an example method for forwarding packets with a backup egress router.

DETAILED DESCRIPTION

Figure 1:
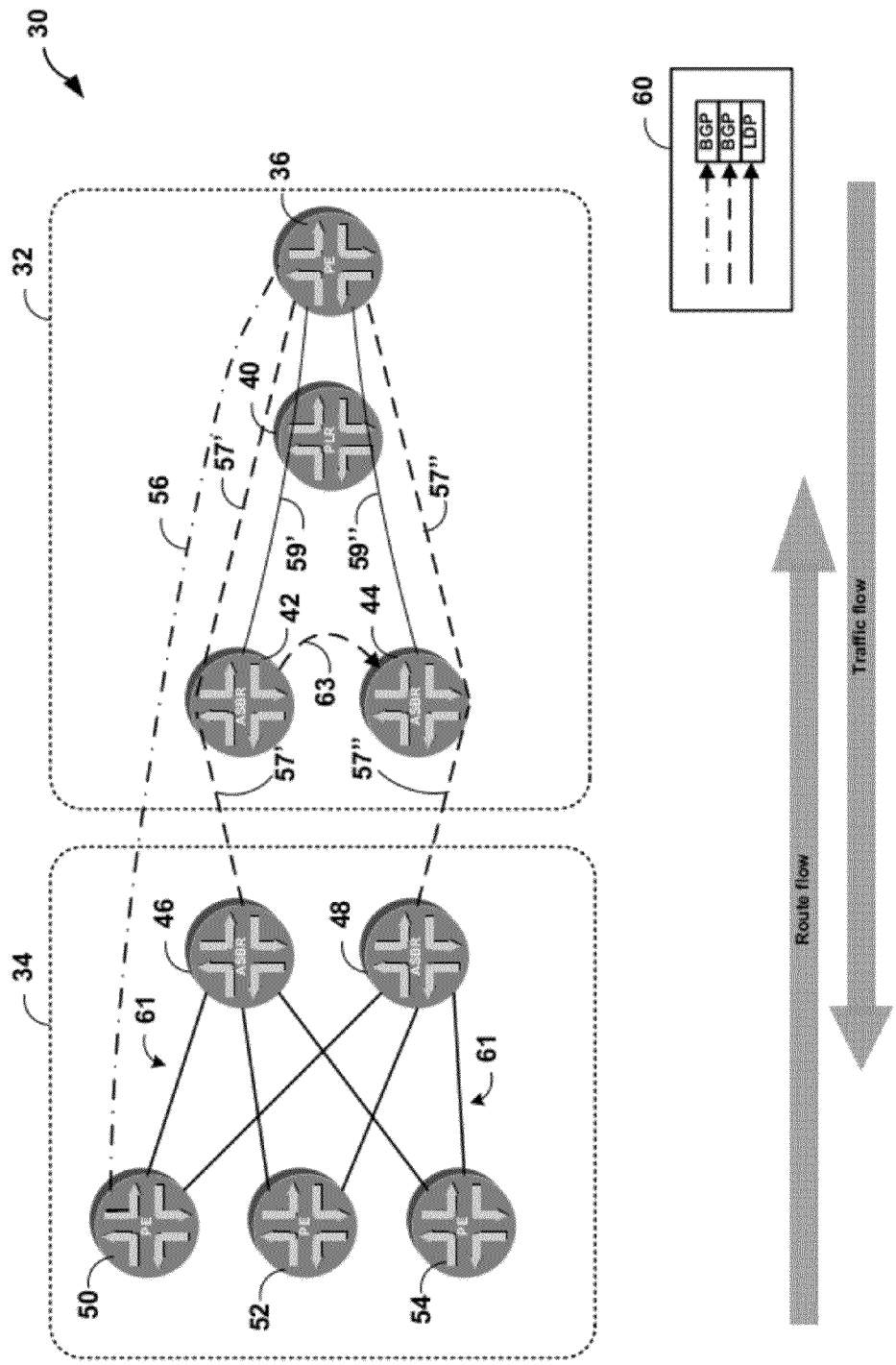
FIG. 1 is a block diagram illustrating an example system that provides protection for an egress router of a label switched path (LSP).

FIG. 1 is a block diagram illustrating example network 30 that provides protection for an egress router of a label switched path (LSP). In the example of FIG. 1, network 30 includes autonomous system (AS) 32 and AS 34, which are independent systems. In general, an autonomous system is an individual collection of network elements, such as routers, switches, links, or other network devices, maintained by, for example, an Internet service provider or other entity. Routers at the edge of an autonomous system are generally referred to as provider edge (PE) routers. AS 32, for example, includes router 36 that is a provider edge router, and AS 34 includes PE routers 50, 52, and 54. In the example of FIG. 1, label distribution messages (e.g., signaling messages for a label distribution protocol such as LDP or RSVP) for forming an LSP are propagated left-to-right, while data to be transported along the LSP are propagated right-to-left.

Different autonomous systems may implement different interior routing protocols, such as open shortest path first (OSPF) or intermediate system to intermediate system (IS-IS). In the example of FIG. 1, AS 32 utilizes IS-IS, while AS 34 utilizes OSPF. Routers at the border of an AS are generally referred to as autonomous system border routers (ASBRs). ASBRs generally implement a border gateway routing protocol (e.g., eBGP), or other routing protocol so that the two respective autonomous systems may properly exchange routing information and forward packets to each other. In the example of FIG. 1, AS 32 includes two ASBRs, ASBR 42 and ASBR 44, while AS 34 includes ASBR 46 and ASBR 48.

As further discussed with respect to FIG. 2, the inter-domain, inter-AS LSP configuration of FIG. 1 actually includes a hierarchy of three LSPs: (1) an end-to-end inter-domain LSP 56 originating from router 36 and terminating at router 50, (2) inter-domain LSPs 57 originating from router 36 and terminating at ASBRs 46, 48, respectively, and (3) intra-domain LSPs 59. Each of AS 32 and AS 34 may provide individual mechanisms for forming LSPs through the respective autonomous system. For example, routers of each of AS 32 and AS 34 may implement various and perhaps different multiprotocol label switching (MPLS) protocols, such as the label distribution protocol (LDP), targeted LDP, resource reservation protocol with traffic engineering extensions (RSVP-TE), or other protocols, to form label switched paths (LSPs) through the respective autonomous system. The techniques may be applied to any transport protocol.

In the example of FIG. 1, AS 32 includes intra-domain LPSs 59 established between PE router 36 and each of ASBR 46 and ASBR 48. These LSPs are formed in accordance with LDP, in the example of FIG. 1. Similarly, AS 34 includes intra-domain LSPs 61 between each of the ASBRs, ASBR 46 and ASBR 48, and each of the PE routers, PE router 50, PE router 52, and PE router 54. In the example of FIG. 1, these interior LSPs are also formed in accordance with LDP.

LSPs 57 are inter-AS LSPs that originate at PE 36 of AS 34 and terminate at ASBRs 46 and 48 of AS 34. LSP 56 is an end-to-end, inter-AS LSP from PE 36 to PE 50. LSP 56 traverses, i.e., is carried by, interdomain LSPs 57 as well as intra-domain LSPs 59, 61. As inter-domain LSPs, LSP 56 and 57 are typically constructed in accordance with a labeled version of the border gateway protocol (LBGP or labeled BGP, e.g., according to RFC 3107). In this manner, LSP 56 actually includes a hierarchy of three paths: the highest level (i.e., inner label of the label stack) LSP between PE 36 and PE 50, an interdomain LSP from PE 36 to ASBRs 46, and certain intra-domain LSPs 57 and 61 that are identified by an outer label of the label stack. The hierarchy of paths is depicted by various dashed and solid lines, as indicated by key 60.

AS 32 and AS 34 may have other internal routers or other network devices, and the dashed and solid lines of FIG. 1 indicate LSPs between devices and the LSPs may traverse multiple intermediate hops, i.e., devices and physical connections. In order to control traffic flow, routers 40-54 allocate distinct MPLS labels for segments of these LSPs, as discussed in greater detail with respect to FIG. 3. Intra-AS LSPs within an AS, such as AS 32, are generally formed by exchanging label distribution messages to advertise labels in accordance with, for example, the label distribution protocol (LDP). Inter-AS LSPs established between autonomous systems, such as between AS 32 and AS 34, are formed by exchanging messages to advertise labels in accordance with, for example, a labeled version of the border gateway protocol (LBGP or labeled BGP). A third label may also be appended to the packets to indicate the endpoint of LSP 56, i.e. PE router 50. In this manner, ASBR 42 is an egress router of the path from PE 36 to ASBR 42.

To form an LSP, such as LSP 56, routers allocate MPLS labels within a label space and utilize label distribution messages to provide the labels to upstream routers along the LSP. Each router may store this information received from other routers, for example in a routing information base and/or forwarding table. Further, each of PE routers 50, 52, and 54 distribute routing information such as their respective IP addresses and destinations reachable by each of the routers. Table 1 depicts example IP addresses for each of PE routers 50, 52, and 54 in the example of FIG. 1:

TABLE 1

| Router | IP Address |
| --- | --- |
| PE Router 50 | 10.0.1.1 |
| PE Router 52 | 10.0.1.2 |
| PE Router 54 | 10.0.1.10 |

Routers along a path, such as LSP 56, typically generate forwarding tables that are used in the data plane to forward traffic, including MPLS packets traversing an LSP. The stored information may include, for example, a destination address or prefix, a label of incoming packets, a label for outgoing packets, label stack operations, such as pushes, swaps and/or pops, and an identifier of a next hop or output interface. Table 2 depicts example forwarding information for ASBR 42:

TABLE 2

| FEC | Incoming Label | Outgoing Label | Next Hop |
| --- | --- | --- | --- |
| 10.0.1.1/32 | 200 | 15 | ASBR 46 |
| 10.0.1.2/32 | 233 | 16 | ASBR 46 |
| 10.0.1.10/32 | 313 | 17 | ASBR 46 |

In the example of FIG. 1, an alternate route between PE router 36 and PE router 50 exists, which includes inter-domain path 57" and the route between ASBR 48 and PE router 50. In accordance with the techniques described herein, ASBR 44 may act as a backup egress router for ASBR 42 with respect to any LSPs terminated on ASBR 42 (e.g., identified by the outer labels of the label stack). For example, ASBR 42 is an egress router for an intra-domain LSP 59 of AS 32 from PE 36 to ASBR 42. ASBR 44 may act as a backup for ASBR 42 for traffic flowing on LSP 56 even though MPLS packets have a label stack in which the label corresponding to LSP 56 is an inner label and ASBR 42 operates as an egress LSR for LSP 59 with respect to the outer label of the label stack. In one embodiment, ASBR 42 and ASBR 44 may each maintain virtual routing and forwarding (VRF) information. In this embodiment, ASBR 44 maintains multiple backup VRFs to provide backup for the VRFs of ASBR 42.

ASBR 42 and ASBR 44 cooperate to establish ASBR 44 as a backup for ASBR 42. For example, ASBR 42 sends label information to ASBR 44 when ASBR 42 sends update messages, e.g., messages 63, to all routers in a core network corresponding to ASBR 44, i.e., AS 32. ASBR 42 may also create an anycast IP address, which is a type of network address that may be used to identify multiple receivers in a manner similar to multicast, but only one of the destinations is chosen at a time to receive packets, that is shared between ASBR 42 and ASBR 44. When ASBR 44 receives one of the messages 63, ASBR 44 may "snoop" information from the update messages of ASBR 42 to acquire the label information. Based on the learned label information, ASBR 44 generates a backup forwarding table. For example, ASBR 44 may listen for inter-region control-plane messages (e.g., BGP messages exchanged between AS 34 and 32) advertising routes. In the event ASBR 44 detects any routes that include the IP anycast address that it is sharing with ASBR 42, ASBR 44 installs the advertised routes within its backup forwarding context and splices its local next hop to that route, as discussed in greater detail below. In some embodiments, ASBR 42 and ASBR 44 are locally configured, e.g., by an administrator, with the anycast IP address.

ASBR 44 automatically uses the backup forwarding table in the event ASBR 44 receives MPLS packets of LSP 56 from router 40 and forwards the MPLS packets on behalf of ASBR 42. ASBR 44 may store the backup forwarding table distinct from a native forwarding table. Table 3 shows an example set of forwarding tables that ASBR 44 may create:

TABLE 3

| FEC | Incoming Label | Outgoing Label | Next Hop |
|---|---|---|---|
| NATIVE FORWARDING CONTEXT | | | |
| 10.0.1.1/32 | 100 | 47 | ASBR 48 |
| 10.0.1.2/32 | 107 | 48 | ASBR 48 |
| 10.0.1.10/32 | 152 | 49 | ASBR 48 |
| BACKUP FORWARDING CONTEXT | | | |
| 10.0.1.1/32 | 15 | 47 | ASBR 48 |
| 10.0.1.2/32 | 16 | 48 | ASBR 48 |
| 10.0.1.10/32 | 17 | 49 | ASBR 48 |

ASBR 44 may store two forwarding contexts, e.g., a native forwarding table and a backup forwarding table. The native forwarding table lists FECs for which LSPs have been established through ASBR 44, an incoming label allocated and advertised to an upstream router by ASBR 44, and outgoing label to use when forwarding the MPLS traffic to a downstream LSR, and a next hop indicating the downstream LSR or physical output interface to which to forward the MPLS traffic for that LSP. In one embodiment, for example, ASBR 44 may store the native forwarding table and the backup forwarding table in distinct forwarding information bases (FIBs) programmed within forwarding chips of a data plane of the router. The backup forwarding context is maintained in a similar fashion except that the portion of the data structure specifying legitimate labels for incoming MPLS packets (i.e., labels allocated and advertised by ASBR 44) has been replaced with labels snooped from advertisements from ASBR 42.

As stated above, when establishing an LSP for which ASBR 42 is an egress, ASBR 42 typically transmits label advertisements (e.g., LDP messages), which ASBR 44 receives. For each FEC in the label advertisement, ASBR 44 may determine whether there exists a route from ASBR 44 to the destination of the FEC definition. If ASBR 44 does have a route to the destination, ASBR 44 may act as a backup for ASBR 42 for that FEC. Although ASBR 42 and ASBR 44 each include LSPs of, for example, FEC 10.0.1.1/32, the label bindings for each of the LSPs are different between ASBR 42 and ASBR 44 as the label bindings are local to each router. ASBR 44 stores the FEC and the advertised label snooped from the advertisement of ASBR 42 in a backup forwarding context as if ASBR 44 had advertised the label to router 40. ASBR 44 then configures the backup forwarding table to store the router's own outgoing label and next hop information of its own native forwarding table and map this information to the label that was advertised from ASBR 42 to router 40 when establishing LSP 59. In other words, the label(s) advertised from ASBR 42 are spliced to ASBR 44's forwarding context in the backup forwarding context by storing the advertised labels as incoming labels that may be legitimately received by ASBR 44 on MPLS packets and mapping the labels to forwarding context (i.e., outgoing labels and next hops) of ASBR 44.

As the immediate upstream LSR, router 40 may be viewed as a point of local repair (PLR) 40. In addition to configuring its backup forwarding context, ASBR 44 executes routing protocols independent of the MPLS protocols to output routing information to inform PLR 40 that ASBR 42 is a reachable destination, as described in greater detail below. In this way, PLR 40 is seamlessly apprised that ASBR 42 is reachable via ASBR 44. When ASBR 42 or a link thereof is unavailable via a direct path, PLR 40 may redirect data, such MPLS packets flowing along LSP 56, to ASBR 44 without modification (e.g., without modifying the label stack) and under the assumption that ASBR 44 will merely forward the traffic to ASBR 42. However, as explained herein, ASBR 44 splices the MPLS traffic into the backup forwarding context and forwards the MPLS traffic to destination 50. Moreover, ASBR 42 maintains the integrity of the label stacks of the MPLS packets so as to provide protection for ASBR 42 even though ASBR 42 is an egress of certain intra-domain LSPs 59 identified by the outer label of the label stack. In this manner, ASBR 44 provides seamless protection for ASBR 42 and no modification to PLR 40 is necessary in order to implement the techniques described herein. Any LSP splicing performed ASBR 44 is transparent to PLR 40.

In the embodiment of FIG. 1, ASBR 42 creates an IP address to be shared by itself and a backup router, i.e. ASBR 44 in this example. For example, ASBR 42 may create an anycast IP address, which is a type of network address that may be used to identify multiple receivers in a manner similar to multicast, but only one of the destinations is chosen at a time to receive packets. When ASBR 42 advertises routing information by way of outputting routing protocol messages, ASBR 42 may advertise the anycast IP address with an internal gateway protocol (IGP) metric of 0. In accordance with the techniques described herein, other edge routers, such as ASBR 44, recognize that a metric of 0 means that the anycast IP address is "owned" by ASBR 42. ASBR 44 in turn outputs routing protocol messages to advertise the same anycast IP address with an IGP metric of infinity −1. The "infinity −1" metric may vary by protocol. For example, OSPF treats "infinity," for the purpose of establishing the IGP metric, as being equal to $2^{16}$. As another example, in IS-IS, "infinity" is equal to $2^{24}$. Other protocols may use other metrics for "infinity."

In this manner, ASBR 44 may depict to other routers, such as PLR 40, that ASBR 42 is reachable from ASBR 44 by a single next hop. In the event ASBR 42 becomes unreachable to PLR 40, PLR 40 may begin to seamlessly forward traffic, including MPLS traffic, to ASBR 44 under the assumption that ASBR 44 will in turn forward the traffic to ASBR 42. However, ASBR 44 forwards the MPLS traffic of LSP 56 along the alternate route, instead of to ASBR 42, thereby providing egress protection with respect to LSPs 59 that terminate at ASBR 42. As explained herein, when ASBR 44 receives traffic destined for its native address, ASBR 44 forwards the traffic according to the native forwarding context, but when ASBR 44 receives traffic destined for the anycast IP address, ASBR 44 forwards the traffic according to the backup forwarding context as described herein.

For example, PLR 40 receives routing advertisements from each of ASBR 42 and ASBR 44 announcing routes to the anycast IP address. PLR 40 determines that the cost to reach the anycast IP address via ASBR 42 is less than the cost to reach the anycast IP address via ASBR 44, due to the IGP metric of the anycast IP address. Therefore, PLR 40 may initially determine that the route to ASBR 42 is more efficient than the route to ASBR 44. Thus, upon performing route resolution and selecting intra-domain routes, PLR 40 may initially utilize an intra-domain LSP 59' that terminates at ASBR 42 for forwarding MPLS traffic of LSP 56 destined for AS 34. PLR 40 may also determine that the route to reach ASBR 42 via ASBR 44 (i.e., to the anycast IP address) is a viable loop free alternate (LFA). Therefore, when ASBR 42 is no longer available, PLR 40 may perform route selection and elect to forward packets of the FEC associated with PE router 50, i.e. FEC 10.0.1.1/32 in the example of FIG. 1, to ASBR 44 using the same intra-domain LSP 59' under the assumption that ASBR will correctly operate as an egress for the MPLS packets and will continue to forward the MPLS packets via LSPs 57 and 56, although ASBR 44 need not be aware of LSP 56. In the process of forwarding these packets to ASBR 44, PLR 40 need not modify or otherwise alter the label stack with respect to MPLS traffic of LSP 56 as PLR 40 is under the assumption that the traffic will properly be forwarded to ASBR 42 that operates as an egress for LSP 57'. In this way the egress protection for failure of ASBR 44 is transparent to PLR 40 any other upstream LSRs.

When ASBR 44 receives packets destined for the anycast IP address, ASBR 44 automatically switches to use the backup forwarding context and uses the appropriate outgoing label as determined from the backup forwarding context (i.e., label 47 in this example), and forwards the packets to the next hop of the backup forwarding context (i.e. ASBR 48).

Example system 30 of FIG. 1 may provide several advantages. For example, system 30 may provide failure protection for an egress of an LSP (intra-domain LSP 57' in this example) in the event the egress LSR or a link to the egress LSR along the LSP fails. In this way, the techniques described herein may provide protection for a stitching point of a BGP LSP by redirecting a local transport LSP around a failed link and/or node. Moreover, the repair scheme implemented by system 30 does not require reconfiguration or modification to any upstream LSR. When implemented in current routers, the techniques may enable MPLS LSP convergence within 50 ms or less. System 30 may also protect egress routers of any type of LSP, such as local LSPs, transport LSPs, and service LSPs.

FIG. 2A is a block diagram illustrating example label stacks and, in particular, changes to the label stacks of an exemplary MPLS packet when the packet is forwarded along LSP 56. The packet generally includes a service payload, such as an IP payload, and three labels, each of the three labels corresponding to a different layer of the LSP between, for example, PE 36 and PE 50. Although described with respect to IP packets and IP payloads, it should be understood that the techniques of this disclosure may generally apply to a packet of any similar protocol. In particular, in the example of FIG. 2A, the packet includes a service label (e.g., VPN label), an interdomain label, and a local label 72. Initially, egress PE 36 receives an IP packet to enter LSP 56. At this time, PE 36 encapsulates the IP packet for form an MPLS packet in which the IP packet is contained within IP payload 78 and preceded by a label stack. Specifically, PE 36 appends a service label 76 to the packet to designate the endpoint of LSP 56, in the example of FIG. 2A. PE 36 also appends interdomain label 74A for LSP 57' and a local label 72A for LSP 59' to form packet 70A. PE router 50 initially advertises service label 76 to router 36 by way of BGP, such as MP BGP. ASBR 46 initially advertises interdomain label 74A to PE 36 via, for example, BGP. Interdomain label 74A identifies next hops between autonomous systems, such as AS 32 and AS 34. Local label 72A specifies a next hop along the intra-domain LSP through AS 32 and is typically advertised by a downstream router, such as PLR 40, via LDP.

In the example of FIG. 2A, PLR 40 receives packet 70A and performs a lookup for a next hop based on the outer label of the label stack, i.e., local label 72A. PLR 40 determines that the next hop is ASBR 42. PLR 40 also determines that ASBR 42, the next hop, is also the endpoint for the local LSP 59' (FIG. 1) through AS 32, so PLR 40 swaps label 72A from packet 70A with label 72B to form packet 70B.

ASBR 42 receives packet 70B, pops label 72B, and performs a lookup based on interdomain label 74A. ASBR 42 swaps interdomain label 74A with interdomain label 74B to form packet 70C. ASBR 42 then forwards packet 70C to ASBR 46.

ASBR 46 receives packet 70C and performs a lookup based on interdomain label 74B. ASBR 46 determines that the next hop for packet 70C is through AS 34. ASBR 46 pops label 74B in the event the inter-domain LSP 57' terminates or, if not, swaps interdomain label 74B with interdomain label 74C. ASBR 46 also appends intra-domain LDP label 72C to packet 70C to form packet 70D. ASBR 46 then forwards packet 70D along PE 56 to a next hop, so that packet 70D will ultimately arrive at PE 50. PE 50 is the egress of LSP 56. Therefore, PE 50 pops off each of local label 72C in the event the upstream LSR has not already removed the LDP label using penultimate hop popping, interdomain label 74C, and service label 76 to form packet 70E, which reflects the encapsulated IP packet within IP payload 78. PE 50 also performs a lookup based on the IP address of IP payload 78 and forwards packet 70E toward the IP address.

Figure 2B:
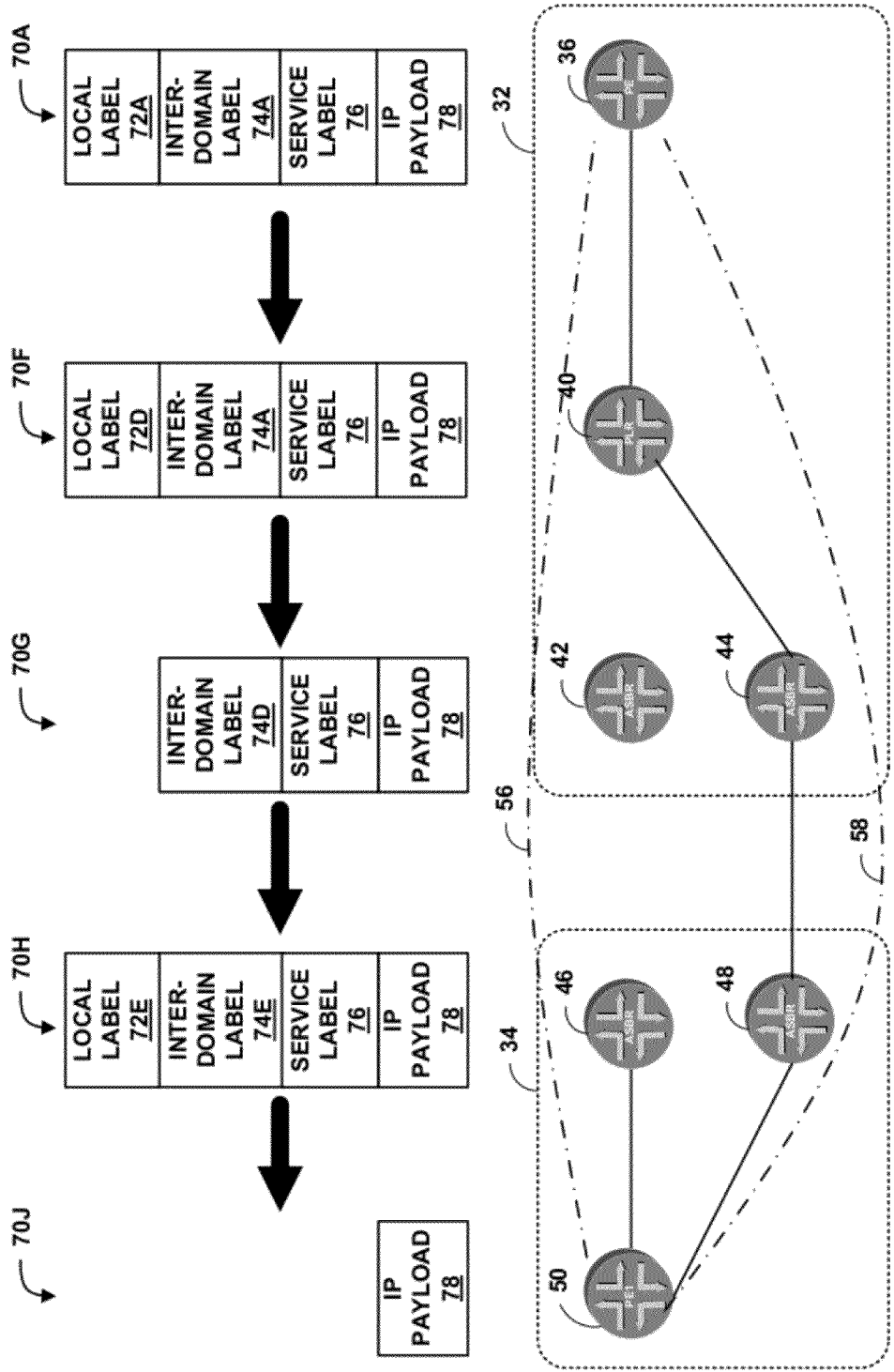

FIG. 2B is a block diagram illustrating changes to labels of a packet when ASBR 42 is no longer available. Initially, as in FIG. 2A, when PE 36 receives the packet including IP payload 78, PE 36 determines an LSP along which to forward packet 70, based on the destination IP address of packet 70 found in IP payload 78. In the example of FIG. 2B, the LSP is LSP 56. PE 36 therefore appends service label 76 to the packet to designate the endpoint of LSP 56, in the example of FIG. 2B. PE 36 also appends interdomain label 74A and local label 72A to the packet to form packet 70A. Interdomain label 74A identifies next hops between autonomous systems, such as AS 32 and AS 34, while local label 72A specifies a next hop along the local path through AS 32. PE 36 then forwards packet 70A to the next hop, i.e. PLR 40.

In the example of FIG. 2B, PLR 40 determines that ASBR 42 is not available. For example, ASBR 42 may have experienced router failure, been brought down by a user, or a link between ASBR 42 and either PLR 40 or ASBR 46 may have failed. However, PLR 40 also determines (although it may not actually be the case) that ASBR 44 lies on a viable route to reach ASBR 42 based on the previously received advertisements with respect to the shared anycast address. In this case, PLR 40 determines that it is not the penultimate router, i.e., it is not the router immediately before the egress. Therefore, PLR 40 swaps label 72A with label 72D to form packet 70F. PLR 40 then forwards packet 70F to ASBR 44 based on an anycast IP address shared by ASBR 44 and ASBR 42.

Upon receiving packet 70F, ASBR 44 pops off label 72D, because in reality ASBR 44 has automatically switched to the backup forwarding context and is operating as an egress for LSP 59'. ASBR 44 therefore performs a lookup based on interdomain label 74A in the backup context, which was earlier populated with information from LSP advertisements from ASBR 42. ASBR 44 also determines to forward the packet along an alternate route, which reaches the same endpoint as LSP 56, by examining the backup forwarding context. ASBR 44 therefore swaps interdomain label 74A with interdomain label 74D to form packet 70G.

ASBR 48 receives packet 70G and performs a lookup based on interdomain label 74D. ASBR 48 determines that the next hop for packet 70G is through AS 34. ASBR 48 pops label 74D in the event the inter-domain path 57" terminates or, if not, swaps interdomain label 74D with interdomain label 74E. ASBR 48 also appends intra-domain LDP label 72E to packet 70G to form packet 70H. ASBR 48 then forwards packet 70H to along the alternate route and ultimately to PE 50.

PE 50 pops off local label 72E in the event the upstream LSR has not already removed the LDP label using penultimate hop popping, interdomain label 74E, and service label 76 to form packet 70J (identical to packet 70E of FIG. 2A, since all that remains is IP payload 78). PE 50 also performs a lookup based on the IP address of IP payload 78 and forwards packet 70J toward the IP address.

FIG. 3 is a flowchart illustrating an example method for populating a backup context of a backup egress router. For the purposes of the discussion of FIG. 3, the egress router to be backed up is referred to as the "primary router" and the router providing the backup is referred to as the "backup router." However, it should be understood that in application a router may act as both a primary and a backup concurrently, as discussed with respect to ASBR 44 of FIG. 1, for example. Generally, the primary router serves as an egress router for at least one label switched path (LSP).

Initially, the primary router develops an anycast IP address to be shared between the primary router and the backup router (100). Both the primary router and the backup router may, for example, be manually configured or may exchange communication to agree on the anycast address. As one example, the primary router may advertise a manually configured anycast IP address as the IP address for other routers to use in order to reach the primary router. The primary router may then transmit the anycast IP address to the backup router (102). In this manner, the primary router and the backup router cooperate to develop the anycast IP address.

The backup router receives and stores the anycast IP address (104). The backup router then advertises to the PLR, i.e. a router immediately upstream from the primary router, that the backup exists as a viable route to reach the primary router, regardless of whether this fact is supported by the network topology (106). That is, the backup router advertises a route to reach the anycast IP address. However, in reality, the backup router will not forward traffic associated with the anycast IP address to the primary router, but by advertising this route to the PLR, the backup router can seamlessly provide backup for the primary router without requiring any changes to the PLR. In one embodiment, the backup router advertises this route with a maximum metric, to force the PLR to select the direct route to the primary while the primary router is operational. In some embodiments, the anycast IP address may be locally configured, e.g., by an administrator, rather than being received from the primary router.

The primary router also advertises a route to reach the anycast IP address to the PLR (108). In one embodiment, the primary router advertises this route as having a metric of zero, to force the PLR to select this advertised route instead of the route advertised by the backup router while the primary router is operational.

The PLR receives the routes to the anycast IP address from the primary and from the backup (110). The PLR stores these routes, for example in a computer-readable medium. In one embodiment, the PLR calculates equal cost paths to the primary and backup router. In another embodiment, the PLR calculates the most efficient route to reach the anycast IP address. When the primary router advertises a metric of zero and the backup advertises a maximum metric, the PLR selects the best route to the primary. In one embodiment, the PLR may also calculate a backup loop-free alternate (LFA) route to reach the primary, i.e., the route advertised by the backup router to reach the primary router at the anycast IP address. In one embodiment, the primary router and the backup router cooperate to ensure that the costs to reach both the primary and the backup from the PLR are equal.

The primary router also transmits label advertisements, such as intra-domain label assignments sent by LDP messages (112). The primary router may transmit the label advertisements to all routers within the core network, e.g., an autonomous system corresponding to the primary router, which includes the backup router and the PLR. As a result, both the backup router and the PLR receive the label advertisements. The PLR stores label information that is to be used for transmitting MPLS packets to the primary router along intra-domain LSPs (116).

The backup router snoops label information from the label advertisements (114). That is, even though the backup would otherwise be unaware of the label advertisements for LSPs to the primary, the backup router examines the label information to identify destinations of paths of which the primary router is a member. When the backup router also has a viable route to reach a destination advertised by the primary router, the backup router stores the label information from the primary router in the backup context, as well as the forwarding information to reach the destination from the backup router's native forwarding context (118).

FIG. 4 is a flow chart illustrating an example method for forwarding packets with a backup egress router. The method of FIG. 4 presumes that the backup router has populated a backup forwarding context, e.g. in accordance with the method discussed with respect to FIG. 3. Initially, the primary router becomes unavailable (130). This could be because the primary router failed, a link along the path failed, a user brought down the router, or for some other reason. In any case, the PLR receives an MPLS packet that is to be forwarded to the primary router for transmission along a label switched path (132). However, the PLR determines that the primary router is not available (134). Therefore, the PLR forwards the packet toward the anycast IP address, i.e. to the backup router (136), intending for the backup router to forward the packet to the primary router.

The backup router receives the packet intended for the anycast IP address (138). Rather than forwarding the packet to the primary router, however, the backup router looks up the next hop information from the backup context (140). The backup router then pops a label intended for the primary router off of the packet and forwards the packet in accordance with the backup routing information (142).

In one embodiment, the backup router performs a recursive MPLS lookup on the received packet to examine a plurality of labels. For example, in the case where a packet includes three labels, as shown in FIG. 2A with respect to packet 70A, the backup router may examine two or more of the labels of the label stack to identify the next hop. That is, the backup router may first pop off local label 72A, then examine interdomain label 74A to identify a next hop. In one embodiment, the backup router may include forwarding information bases (FIBs) that refer to other FIBs in a hierarchical manner. When the backup router processes a native packet, i.e. a packet that is to be routed in accordance with a native forwarding context, the backup router (acting as a primary router in this case) may pop off all three labels to identify a next hop for the packet. The backup router may additionally perform a service-specific lookup when the LSP is a service LSP. For example, for a layer 3 virtual private network (L3VPN), the lookup may identify two MPLS labels and the IP service, i.e., {MPLS, MPLS, IP}. For a virtual private LAN service (VPLS), the lookup may identify two MPLS labels and the VPLS service, i.e., {MPLS, MPLS, VPLS}.

Figure 5:
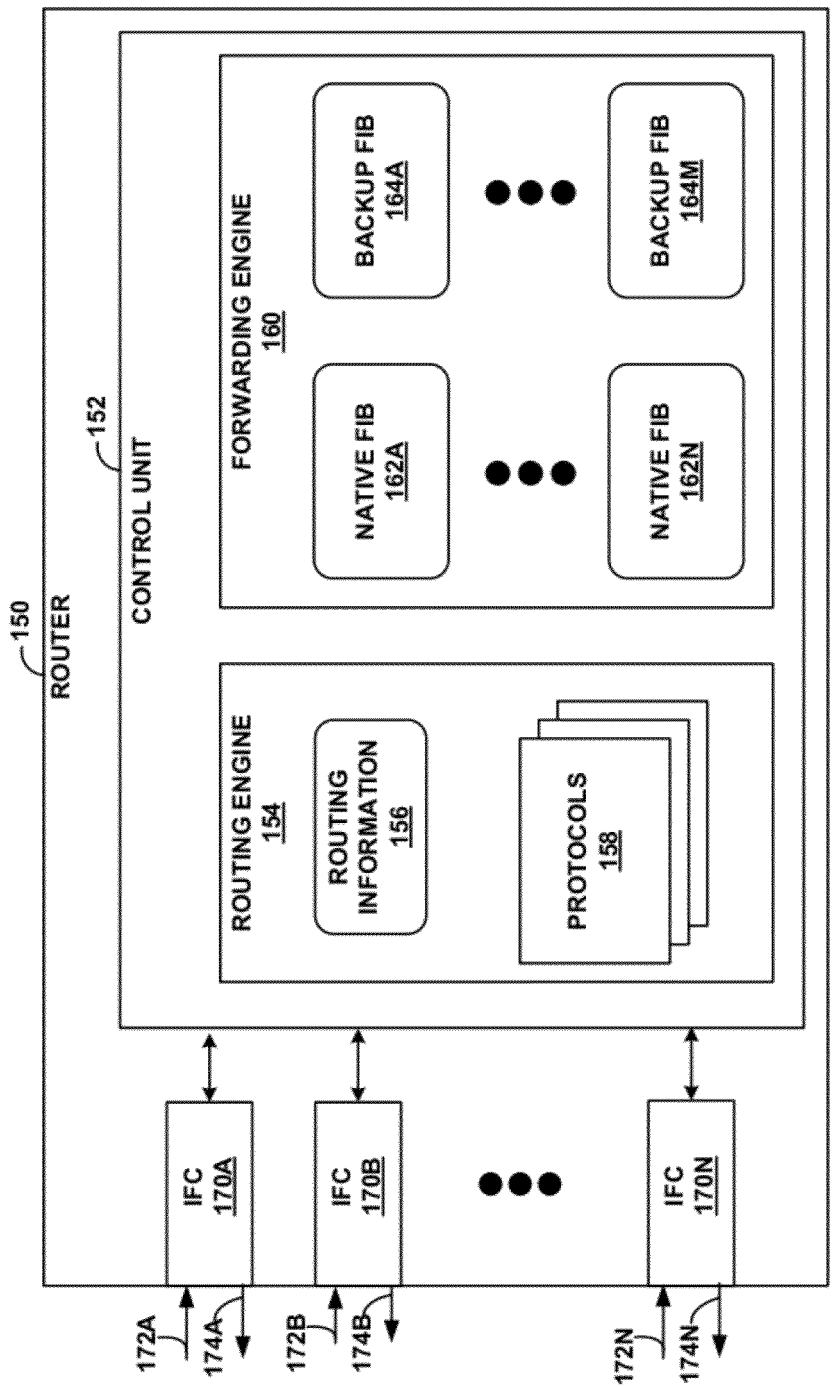
FIG. 5 is a block diagram illustrating an example embodiment of a routing device that can act as a backup for an egress router of a label switched path.

FIG. 5 is a block diagram illustrating an example embodiment of router 150 that can act as a backup for an egress router of a label switched path. In the example embodiment of FIG. 5, router 150 includes interface cards 170A-170N (IFCs 170), for communicating packets via inbound links 172A-172N ("inbound links 172") and outbound links 174A-174N ("outbound links 174"). IFCs 170 are coupled to inbound links 172 and outbound links 174 via a number of interface ports (not shown).

In the embodiment of FIG. 5, router 150 includes control unit 152, which includes routing engine 154 and forwarding engine 160. Routing engine 154 is responsible for maintaining and updating routing information 156. Routing information 156 may describe a topology of a network, and more particularly, routes through the network. For example, routing information 156 may include route data that describes various routes through the network, and also next hop data indicating appropriate neighboring devices within the network for each of the routes. Routing engine 154 periodically updates routing information 156 to accurately reflect the current network topology.

Routing engine 154 analyzes its stored routing information 156 and generates forwarding information for use by forwarding engine 160. In accordance with the techniques described herein, forwarding engine 160 stores both native forwarding information and backup forwarding information in various forwarding information bases (FIBs). Routing engine 154 may generate FIBs 162, 164 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety. In other embodiments, other data structures may store a FIB, such as a linked list, an array, a matrix, a tree, or other data structures. In the example of FIG. 5, forwarding engine 160 stores native forwarding information in native FIBs 162A-162N (native FIBs 162) and backup forwarding information in backup FIBs 164A-164N (backup FIBs 164). Native FIBs 162 and backup FIBs 164 associate, for example, network destinations with specific next hops and corresponding IFCs 170. Native FIBs 162 and backup FIBs 164 are, therefore, based on routing information 156. Routing engine 154 also implements various routing protocols 158, which may comprise software processes having instructions executed by a computing environment. Routing engine 154 may implement various MPLS protocols, such as LDP, RSVP, labeled BGP, or other labeling protocols. Protocols 158 may include other non-labeled protocols as well.

In general, routing engine 154 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 154 may further include computer readable storage medium, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein. Moreover, forwarding engine 160 may be provided by dedicated forwarding integrated circuits normally associated with high-end routing components of a network router. Consequently, routing engine 154 and forwarding engine 160 may operate as a high-end router.

Forwarding engine 160 may maintain separate native FIBs 162 respectively associated with, for example, different VPNs or LSPs. Likewise, forwarding engine 160 may maintain separate backup FIBs for each egress router for which router 150 provides backup support. Control unit 152 may therefore select the appropriate FIB based on a mapping that maps an interface port of IFCs 170 to a FIB. Moreover, control unit 152 selects one of native FIBs 162 or backup FIBs 164 based on the intended address of a received packet. That is, when the packet is intended for a shared anycast IP address, control unit 152 refers to backup FIBs 164, otherwise control unit 152 refers to native FIBs 162.

Each of native FIBs 162 and backup FIBs 164 associate next hops with interface ports of IFCs 170. Each of the FIBs also stores label information that includes an incoming label, an outgoing label, and a next hop for a packet. The FIBs may include information similar to Tables 2 and 3 discussed with respect to FIG. 1.

Router 150 may provide backup for any number of egress routers in a network. Similarly, router 150 may receive backup services from any number of backup routers in the network. That is, router 150 may be a primary router in certain contexts and a backup router in other contexts. In this manner, the techniques described herein provide an M:N protection scheme for egress routers of a network, in that one router may backup many other routers, and one router may be backed up by many other routers. In one embodiment, each edge router of a system may provide backup for each other edge router. In another embodiment, the edge routers may form a chain of backups, wherein each edge router provides backup for one other edge router of the system. Other embodiments may utilize other protection schemes for backing up one or more edge routers.

Figure 6:
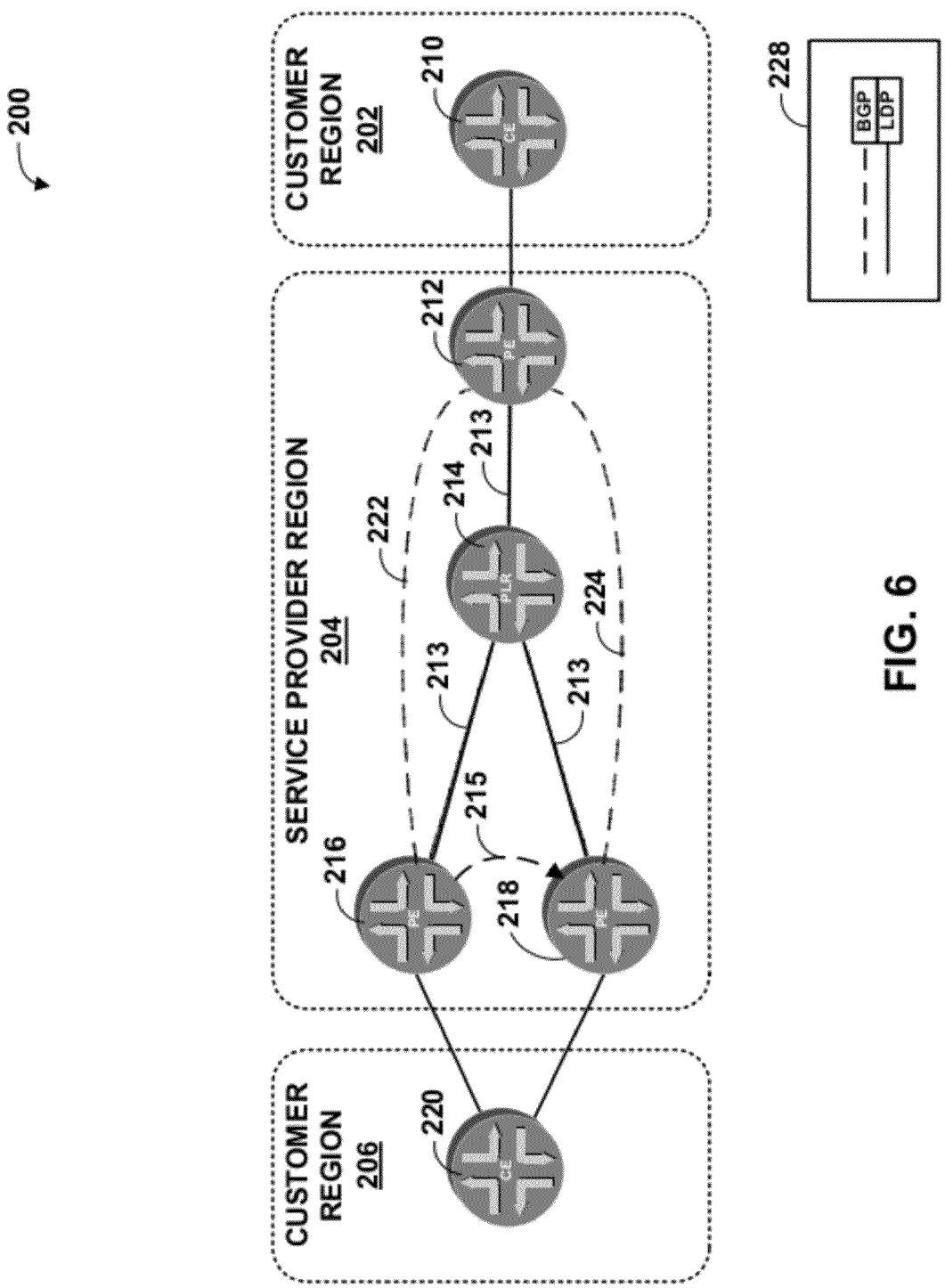
FIG. 6 is a block diagram illustrating another example system that provides protection for an egress router of an LSP.

FIG. 6 is a block diagram illustrating another example computing system 200 that provides protection for an egress LSR of an LSP, router 216 in this example. System 200 may provide protection for an egress router of a service LSP, such as, for example, a L3VPN or L2VPN (Pseudowire or VPLS) service. System 200 includes service provider region 204 and two customer regions, customer region 202 and customer region 206. LSP 222 and LSP 224 are label switched paths for crossing service provider region 204. In the example of FIG. 6, provider edge (PE) router 218 provides backup for PE router 216. PE router 216 is the endpoint of LSP 222, while PE router 218 is the endpoint of LSP 224.

PE routers 216 and 218 each distribute labels through service provider region 204 to form LSPs 222 and 224, respectively. PE router 212 is an ingress point for both LSPs 222 and 224. In the example of FIG. 6, PE routers 216 and 218 distribute labels according to both LDP and labeled BGP. PE routers 216 and 218 distribute LDP labels to PLR 214 and PLR 214 distributes LDP labels to PE router 212 to establish LDP LSPs 213. PE routers 216 and 218 also distribute BGP labels to PE router 212 to establish LSPs 222 and 224, respectively. The label distributions by protocol are shown in reference box 228. In accordance with the techniques described herein, PE router 218, providing protection for PE router 216, snoops BGP label advertisements 215 to acquire labels from PE router 216. PE router 218 stores these labels in a backup forwarding context.

PE router 216 and 218 also cooperate to establish a shared, anycast IP address. In accordance with the techniques described herein, PE router 216 establishes the anycast IP address as the next hop in the BGP advertisements. PE router 218 populates the backup context by splicing native next hops towards CE router 220 with the labels snooped from PE router 216 BGP label advertisements 215.

PLR 214 calculates loop free alternates (LFAs) to identify routes to reach CE router 220. Thus PLR 214 determines that PE router 218 is on a route to reach PE router 216, although this is not necessarily the case in actuality. Therefore, when PE router 216 is no longer available, and when traffic is forwarded from CE router 210 to service provider region 204 to be transported over LSP 222, PLR 214 directs the traffic of LSP 222 to PE router 218 rather than 216. PE router 218 refers to the backup context for this traffic to identify the next hop of the traffic, i.e. CE router 220.

In one embodiment, PE router 216 and PE router 218 may provide backup for each other. Therefore, in the case that PE router 216 is not available, PE router 218 provides routing services as a backup, and in the alternative case that PE router 218 is not available and PE router 216 is available, PE router 216 provides routing services as a backup.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied in a computer readable medium containing instructions. Instructions embedded in a computer readable medium may cause a programmable processor, or other processor, to perform the method, e.g. when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Although described primarily with respect to the multi-protocol label switching (MPLS) protocol, it should be understood that the techniques of this disclosure may be applied to any networking system that uses encapsulation layers and switched paths. For example, the techniques of this disclosure may be applied to provider backbone bridges (as described in the IEEE 802.1 ah-2008 standard), provider backbone bridge traffic engineering (as described in the IEEE 802.1Qay), transport MPLS, MPLS transport profile, or other label switching protocols or techniques for enabling virtual private networks.

Various embodiments have been described. These and other embodiments are within the scope of the following claims.

The invention claimed is:

1. A method comprising:
    outputting one or more label advertisements in accordance with a label distribution protocol to establish a label switched path (LSP) through a network from an ingress router to an egress router;
    configuring a backup router within the network to maintain a backup forwarding context, in addition to a native forwarding context, that stores one or more labels advertised by the egress router as if the labels were advertised by the backup router, wherein the backup forwarding context maps the labels advertised by the egress router to forwarding next hops of the backup router, wherein the backup router stores the forwarding next hops of the backup router in the native forwarding context;
    switching to the backup forwarding context within the backup router upon receiving a multiprotocol label switching (MPLS) packet intended for the egress router of the LSP and including at least one of the labels advertised by the egress router; and
    using the backup forwarding context, modifying a label stack of the MPLS packet with one of the labels of the backup forwarding context and forwarding the MPLS packet with the backup router to a destination as if the backup router were the egress of the LSP.

2. The method of claim 1, wherein modifying a label stack comprises popping or swapping the label advertised by the egress router.

3. The method of claim 1, wherein the backup router is not positioned along the LSP.

4. The method of claim 1, wherein configuring the backup router comprises:
    outputting a routing message from the backup router indicating that the egress router and the backup router share a network address;
    snooping, with the backup router, label distribution messages advertising routes to destinations and corresponding labels;
    determining whether the advertised routes utilize the shared network address; and
    when the advertised routes utilize the shared network address, installing the corresponding labels advertised by the egress router into the backup forwarding context of the backup router.

5. The method of claim 1, wherein configuring the backup router comprises outputting a routing message from the backup router to at least one upstream router along the LSP indicating that the egress router is reachable via a route from the backup router.

6. The method of claim 1, wherein the backup router forwards the MPLS packet along a route that does not include the egress router.

7. A system comprising:
    an ingress router of a network;
    an egress router of the network that outputs one or more label advertisements in accordance with a label distribution protocol to establish a label switched path (LSP) through the network from the ingress router to the egress router;
    a backup router that maintains a native forwarding context that stores one or more labels advertised by the backup router and forwarding next hops associated with the labels advertised by the backup router, and a backup forwarding context that stores one or more labels advertised by the egress router as if the labels were advertised by the backup router, wherein the backup forwarding context maps the labels advertised by the egress router to the forwarding next hops stored in the native forwarding context; and
    a point of local repair (PLR) router that receives the label advertisements of the egress router and the labels advertised by the backup router, wherein the PLR router lies along the LSP, and wherein when the PLR router determines that the egress router is not available, the PLR router forwards at least one multiprotocol label switching (MPLS) packet that was intended for the egress router to the backup router and that includes at least one of the labels advertised by the egress router,
    wherein the backup router switches to the backup forwarding context within the backup router upon receiving the MPLS packet, uses the backup forwarding context to modify a label stack of the MPLS packet with one of the labels of the backup forwarding context, and forwards the MPLS packet to a destination as if the backup router were the egress of the LSP.

8. The system of claim 7, wherein the backup router modifies the label stack by popping or swapping the label advertised by the egress router.

9. The system of claim 7, wherein the backup router is not positioned along the LSP.

10. The system of claim 7, wherein the backup router outputs a routing message indicating that the egress router and the backup router share a network address, snoops label distribution messages advertising routes to destinations and corresponding labels, determines whether the advertised routes utilize the shared network address, and when the advertised routes utilize the shared network address, installs the corresponding labels advertised by the egress router into the backup forwarding context.

11. The system of claim 7, wherein the backup router outputs a routing message to the PLR router indicating that the egress router is reachable via a route from the backup router.

12. The system of claim 7, wherein the backup router forwards the MPLS packet along a route that does not include the egress router.

13. A router comprising:
    a routing engine that receives one or more label advertisements in accordance with a label distribution protocol from an egress router for establishing a label switched path (LSP) between the egress router and an ingress router, wherein the routing engine generates backup forwarding information from the one or more label advertisements; and
    a forwarding engine that maintains a native forwarding context that stores one or more labels advertised by the backup router and forwarding next hops associated with the labels advertised by the backup router, and a backup forwarding context that stores the backup forwarding information generated by the routing engine, wherein the backup forwarding context maps the labels advertised by the egress router to the forwarding next hops stored in the native forwarding context;
    wherein, upon receiving a multiprotocol label switching (MPLS) packet intended for the egress router of the LSP and that includes at least one of the labels advertised by the egress router, the forwarding engine switches to the backup forwarding context within the backup router and, using the backup forwarding context, modifies a label stack of the MPLS packet with one of the labels of the backup forwarding context and forwards the MPLS packet to a destination as if the router were the egress of the LSP.

14. The router of claim 13, wherein modifying a label stack comprises popping or swapping the label advertised by the egress router.

15. The router of claim 13, wherein the backup router is not positioned along the LSP.

16. The router of claim 13, wherein router outputs a routing message indicating that the egress router and the router share a network address, snoops label distribution messages advertising routes to destinations and corresponding labels, determines whether the advertised routes utilize the shared network address, and when the advertised routes utilize the shared network address, installs the corresponding labels advertised by the egress router into the backup forwarding context of the backup router.

17. The router of claim 13, wherein the router outputs a routing message to at least one upstream router along the LSP indicating that the egress router is reachable via a route from the backup router.

18. The router of claim 13, wherein the router forwards the MPLS packet along a route that does not include the egress router.

19. A non-transitory computer-readable medium comprising instructions for causing a programmable processor to:
    output one or more label advertisements in accordance with a label distribution protocol to establish a label switched path (LSP) through a network from an ingress router to an egress router;
    configure a backup router within the network to maintain a backup forwarding context, in addition to a native forwarding context, that stores one or more labels advertised by the egress router as if the labels were advertised by the backup router, wherein the backup forwarding context maps the labels advertised by the egress router to forwarding next hops of the backup router, wherein the backup router stores the forwarding next hops of the backup router in the native forwarding context;

switch to the backup forwarding context within the backup router upon receiving a multiprotocol label switching (MPLS) packet intended for the egress router of the LSP and including at least one of the labels advertised by the egress router; and use the backup forwarding context to modify a label stack of the MPLS packet with one of the labels of the backup forwarding context and to forward the MPLS packet with the backup router to a destination as if the backup router were the egress of the LSP.

20. The non-transitory computer-readable medium of claim 19, wherein the instructions to configure the backup router comprise instructions to:

output a routing message from the backup router indicating that the egress router and the backup router share a network address;

snoop, with the backup router, label distribution messages advertising routes to destinations and corresponding labels;

determine whether the advertised routes utilize the shared network address; and when the advertised routes utilize the shared network address, install the corresponding labels advertised by the egress router into the backup forwarding context of the backup router.

21. A method comprising:

outputting one or more label advertisements in accordance with a label distribution protocol to establish a label switched path (LSP) through a network from an ingress router to an egress router;

configuring a backup router within the network to maintain a backup forwarding context, in addition to a native forwarding context, that stores one or more labels advertised by the egress router as if the labels were advertised by the backup router, wherein the backup forwarding context maps the labels advertised by the egress router to forwarding next hops of the backup router, wherein the backup router stores the forwarding next hops of the backup router in the native forwarding context;

switching to the backup forwarding context within the backup router upon receiving a packet of a label switching protocol, wherein the packet is intended for the egress router of the LSP, and wherein the packet includes at least one of the labels advertised by the egress router as an encapsulated label; and using the backup forwarding context, modifying a label stack of the packet with one of the labels of the backup forwarding context and forwarding the packet with the backup router to a destination as if the backup router were the egress of the LSP.

* * * * *